United States Patent [19]
Bellati et al.

[11] 3,751,119
[45] Aug. 7, 1973

[54] AUXILIARY BEARING FOR MOUNTING A TURBINE SHAFT

[75] Inventors: Hans Bellati, Wettingen; Hans Huber, Niederrohrdorf; Willi Rutti, Nussbaumen, all of Switzerland

[73] Assignee: Aktiengesellschaft Brown, Boveri & Cie, Baden, Switzerland

[22] Filed: Apr. 18, 1972

[21] Appl. No.: 245,241

[30] Foreign Application Priority Data
May 12, 1971 Switzerland.......................... 7000/71

[52] U.S. Cl. .................................................. 308/9
[51] Int. Cl. ............................................. F16c 17/16
[58] Field of Search............................... 308/9, 122

[56] References Cited
UNITED STATES PATENTS
315,777  4/1885  Hallock................................... 308/9

*Primary Examiner*—Charles J. Myhre
*Assistant Examiner*—Frank Susko
*Attorney*—Ralph E. Parker et al.

[57] ABSTRACT

An auxiliary bearing structure for temporary use during installation of turbine shafting for temporarily supporting and aligning adjoining flanged ends of two shaft sections to be connected together at the flanges. The auxiliary bearing consists primarily of a bearing yoke located in the centroidal plane of the adjoining shaft sections below the end flanges which rest upon the bearing surface, the latter being pressure lubricated to permit turning of the shaft sections. The bearing yoke is vertically adjustable in the radial direction of the shafting in order to effect the desired alignment and can be fixed in the lateral direction after reaching the position of alignment. Means are also provided for holding the auxiliary bearing yoke in a "down" position out of contact with the shaft flanges while the turbine is in service.

8 Claims, 2 Drawing Figures

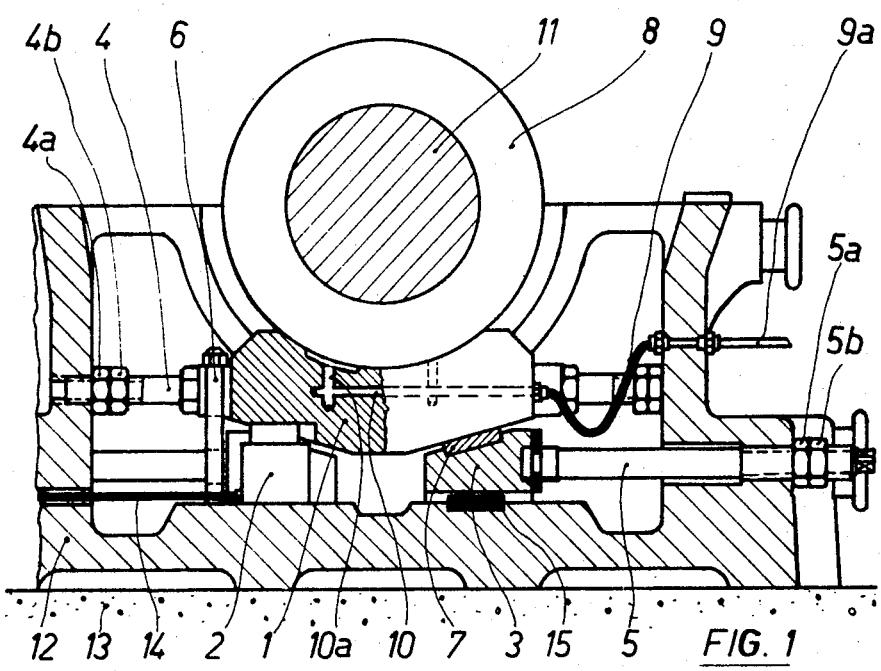
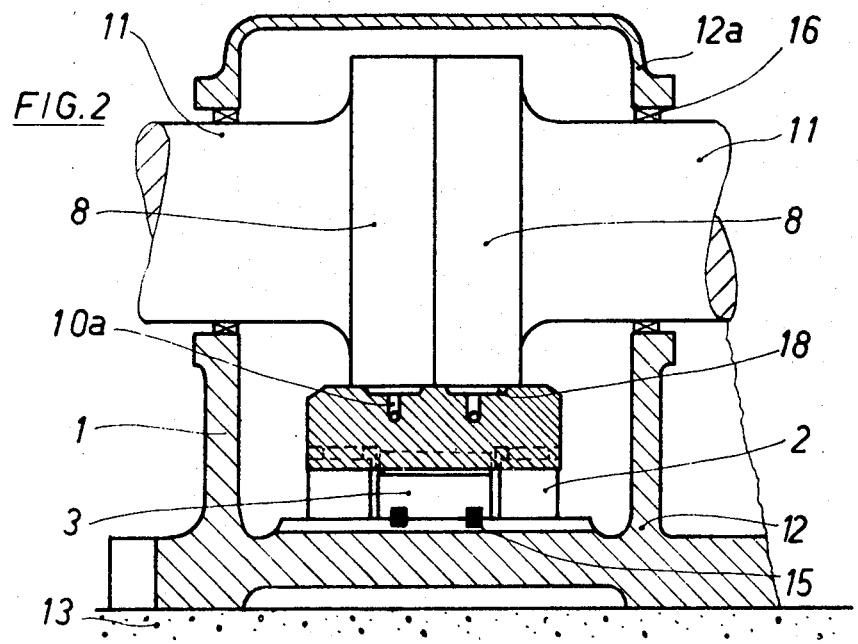

AUXILIARY BEARING FOR MOUNTING A TURBINE SHAFT

The present invention relates to an auxiliary bearing for installing a turbine shaft, in particular the shaft of a steam turbine.

When installing the axial sections of a turbomachine shaft a number of installation aids are needed in order to satisfy the requirements regarding correct running of the machine during service. It is required of the auxiliary installation bearing that it should bring the rotor or the rotor parts into a matching position and direction to assure accurate coupling of the parts and, when the machine is overhauled, to relieve the main bearings so that these can be dismantled.

A method of meeting these requirements is known which makes use of pressure-lubricated steel shells suspended by means of adjustable bolts from a bracket supported on the bearing pedestal.

The rise in turbine unit capacities and the increase in the weights of the shafts, particularly in the case of turbines for nuclear power stations create difficulties in that shaft rotation in the steel shells is almost impossible owing to the risk of seizure, while raising the shaft by means of bolts can be achieved only by extending the shaft string in the axial direction to accommodate the auxiliary installation device. Furthermore, positioning the shaft string exactly by means of screw bolts which are loaded by the weight of the shaft is difficult and necessitates extensive extra work.

The principal object of the present invention is to provide an improved auxiliary bearing which permits simple and accurate installation while avoiding the disadvantages stated above.

This objective is achieved in that an auxiliary yoke is located in the centroidal plane at least at one end of the turbine shaft such that the bearing surface of the yoke touches the peripheral surface of at least one shaft-coupling flange and the bearing surface is supplied by way of a pipe and bores with high-pressure oil for lubrication purposes, the auxiliary yoke being adjustable in the radial and tangential directions relative to the turbine shaft by means of screw bolts and hydraulic jacks.

The advantages of the invention lie in the fact that installation and alignment of the turbine shafts are simplified, and in particular access to the coupling flange is improved.

A further advantage of the invention is the extended range of application of the auxiliary bearing, since the bearing yokes and their supports are not limited by the shaft weight, either upward or downward, but are simply matched to the coupling flanges.

In another form of this invention the auxiliary yoke is incorporated in the bearing pedestal of the turbomachine.

The particular advantage of this embodiment is that all operations associated with installation are concentrated at a single device, thus resulting in a reduction of the absolute length of the machine, i.e. for the same unit capacity, the turbo-machine has smaller dimensions than with prior constructions, thus yielding a saving in space.

A particular embodiment of the invention is distinguished by the fact that during erection of the turbomachine, the auxiliary yoke is held in a fixed position with respect to the bearing pedestal by means of adjustable wedges and screw bolts.

A preferred embodiment of the invention is illustrated by the accompanying drawings, in which:

FIG. 1 is a cross-section of the auxiliary bearing; and
FIG. 2 is a longitudinal section of the auxiliary bearing.

In FIG. 1 the auxiliary yoke 1 of ductile cast iron, i.e. without a lining of bearing metal, is supported in bearing pedestal 12 by way of piston jacks 2. The auxiliary yoke 1 is provided with bores 10 and 10a connected to flexible tube 9 and supply pipe 9a which convey a lubricant under high pressure. The outer circumference of the shaft coupling flange 8 is in the form of a bearing contact surface, the flange acting as a bearing when the shaft turns. The shaft 11 is raised or aligned by means of piston jacks 2 which are supplied with a pressurized medium by way of pipe 14. When coupling flange 8 has attained the required position, wedges 3, which are fitted with spherical pressure plates 7, are moved against auxiliary yoke 1. This movement, or bracing, of yoke 1 is effected by compression bolts 5, which are moved, for example, by means of nuts 5a and 5b. The wedges 3 are provided with keys 15 to assure correct movement.

On reaching the prescribed positon, the auxiliary yoke 1 is also fixed in the lateral direction. Tension bolts 4 with nuts 4a and 4b are provided for this purpose. These can be replaced by hydraulic or pneumatic clamping devices.

When the turbine is in operation, auxiliary yoke 1 is lowered so that the coupling flange 8 can turn freely with respect to the contact surface of auxiliary yoke 1. The auxiliary yoke 1 is then fixed by security bolts 6 to bearing pedestal 12, which in turn rests on, and is fixed to, foundation 13.

The hydraulic jacks 2 can be removed while the turbine is in operation, and need not be inserted again between auxiliary yoke 1 and bearing pedestal 12 until the shaft is to be dismantled.

FIG. 2 shows a longitudinal section through the auxiliary bearing, the reference numbers denoting the same parts as in FIG. 1.

Bearing pedestal 12 is fitted with a cover 12a, the openings 16 for the shaft being provided with sealing rings 17. The demands made of these sealing rings are not exacting since they are intended only to prevent the escape of oil injected from time to time to the bearing surface of auxiliary yoke 1.

Bores 10a in auxiliary yoke 1 lead to oil pockets 18. It must be noted that at times only one coupling flange 8 rests on auxiliary yoke 1 and is lubricated as the shaft 11 turns.

The keys 15 of wedges 3 are located in slots in bearing pedestal 12 and are in the form of sliding feather keys. They could, however, be replaced by trapezoidal keys which engage in bearing pedestal 12 and wedge 13.

After the shaft sections have been brought into the desired alignment, the flanges 8, 8 are secured together. This can be accomplished by means of a series of circumferentially spaced bolts, not illustrated, which interconnect the flanges, or by any other acceptable interconnecting means.

We claim:

1. An auxiliary bearing structure for temporary use during installation of turbine shafting and particularly for temporarily supporting and aligning the adjoining flanged ends of two shaft sections to be connected together at said flanges, comprising an auxiliary bearing yoke located in the centroidal plane of the adjoining shaft sections below the flanged ends thereof, said flanges resting upon the arcuate bearing surface of said yoke, means supplying said bearing surface with a presurized lubricating medium to facilitate turning of the flanged ends on the bearing surface, means for adjusting said bearing yoke in the radial direction of said shafting to attain the desired position of shaft alignment, and means for thereafter fixing said bearing yoke in a lateral direction.

2. An auxiliary bearing structure as defined in claim 1 wherein said bearing yoke is incorporated in the bearing pedestal structure of the turbine.

3. An auxiliary bearing structure as defined in claim 1 and which includes means for holding said bearing yoke in a down positon free from contact with said shaft flanges while said turbine is in service.

4. An auxiliary bearing structure as defined in claim 1 wherein said means for adjusting said bearing yoke in the radial direction is constituted by hydraulic jacks and which further includes adjustable wedges slidable along the lower face of said bearing yoke to brace the yoke after movement thereof into the proper position of shaft alignment by said hydraulic jacks.

5. An auxiliary bearing structure as defined in claim 4 and wherein said adjustable wedges include keys located in and slidable along slots provided in the bearing pedestal of the turbine.

6. An auxiliary bearing structure as defined in claim 5 wherein said adjustable wedges are actuated by screw bolts.

7. An auxiliary bearing structure as defined in claim 1 and which further includes a cover enclosing said bearing yoke and which is provided with lateral passthrough openings accommodating said flanged shaft ends, and ring seals at said openings to prevent escape of said pressurized lubricating medium injected from time to time to said bearing surface.

8. An axuiliary bearing structure as defined in claim 1 wherein said means for fixing said bearing yoke in a lateral direction is constituted by screw bolts engageable with the sides of said yoke.

* * * * *